Inventors.
Robert J. Norman, &
Mitchell S. Budniak.
By Hume, Clement, Hume & Lee
Attorneys Inventors.
Robert J. Norman, &
Mitchell S. Budniak
By Hume, Clement, Hume & Lee
Attorneys Inventors.
Robert J. Norman &
Mitchell S. Budniak.
By Hume, Clement, Hume & Lee
Attorneys United States Patent Office 3,507,460

Patented Apr. 21, 1970

3,507,460

CONTROL CIRCUIT

Robert J. Norman and Mitchell S. Budniak, Chicago, Ill., assignors to The Powers Regulator Company, Skokie, Ill., a corporation of Illinois Filed Feb. 14, 1968, Ser. No. 705,402

Int. Cl. B65g *51/42*

U.S. Cl. 243—16 10 Claims

ABSTRACT OF THE DISCLOSURE

A carrier of a pneumatic tube system is directed through a series of interconnected paths to a desired destination according to an addressing code defined by the relative spacing of code elements on the carrier. Spaced sensing devices are responsive to momentary alignment of carrier code elements of a related preselected spacing to provide time coincident signals which ultimately actuate a guide arm to divert the carrier from a first to a second routing path. Due allowance for system tolerances has required that at least one of the electrical signals generated by an appropriately addressed carrier be of relatively long duration to assure the required time coincidence; under these circumstances, the number of possible addresses on a carrier of reasonable length is prohibitively small at high carrier velocities. It has been found that the necessary pulse duration to insure coincidence varies inversely with carrier velocity and a compensating means is disclosed which complements this characteristic to permit the system to reliably distinguish between closely adjacent code element positions at all carrier velocities within a broad range. The compensating circuit may concomitantly be employed to effect a substantial enhancement in the noise immunity of the circuit. In addition, apparatus for providing distortion free code signals at high carrier velocities is disclosed.

BACKGROUND OF THE INVENTION

The present invention relates generally to pneumatic tube systems or the like and, more particularly, to apparatus for permitting reliable routing of a precoded carrier to a selected destination at any of a broad range of carrier velocities.

Multi-station pneumatic tube systems are useful in stores, offices and factories to transmit bills or other information from a central handling station to any other selected station in the network. Conventionally, the destination of a carrier is established by a code represented by the relative spacing of code elements, such as magnets, mounted on the body of the carrier. The relative spacing of the magnets is, of course, adjustable to correspond to the code address of the desired destination.

A control device precedes each junction between two tubular passages in the transport network and includes sensing elements, such as inductor coils, of a relative spacing corresponding to one code element address. Momentary alignment of a carrier of this code element address with the sensing coils develops concurrent electrical signals in the sensing coils which signals are effective to operate a guide arm positioned at the junction of the passages and thereby route the carrier into the appropriate passage.

Dimensional tolerances and other deviations from a desired norm are inherent in any such system, and accordingly, it is required that at least one of the electrical signals developed in spaced sensing coils be of a sufficient duration to accommodate the range of possible tolerance error and assure that a time coincidence exists between signals of an appropriately addressed carrier. Because of this tolerance range, adjacent code addresses must be sufficiently spaced to avoid time overlapping of signals of different carrier addresses. At slow carrier speeds, the necessary code element spacing between adjacent positions to avoid signal overlapping still permits an adequate number of code addresses on a carrier of reasonable length. However, at higher carrier velocities, the spacing between adjacent addresses must be progressively increased to such an extent that the number of discernable addresses on a carrier of reasonable length becomes prohibitively small. The problem is further compounded by the fact that high carrier velocities are most essential in large transport networks which have a large number of stations, thereby demanding a correspondingly large number of code addresses.

Also, at relatively high carrier velocities, it has been found that the signals induced in the sensing coils become distorted in waveform in such a manner as to result in spurious or unreliable actuation of the path defining mechanism. In this regard, spurious actuation of the path defining mechanism has also been a prevailing problem in the prior art independently of waveform distortion because the environments of use of such systems often include other electronic apparatus which generates stray electromagnetic radiation of a type to falsely operate the system.

SUMMARY OF THE INVENTION

It is therefore a general object of the present invention to provide a new and improved pneumatic tube system or the like which overcomes the aforenoted deficiencies of the prior art.

It is another object of the present invention to provide a system of the foregoing type in which closely spaced addressing codes are accurately and reliably distinguished at all carrier velocities within a broad range.

It is a further object of the present invention to provide such a system in which spurious operation of the path defining mechanism due to either distortion of the induced carrier signal or to stray electromagnetic radiation is substantially obviated.

Accordingly, the invention relates to a pneumatic tube system or the like in which a carrier is selectively directed through a transport network including a plurality of interconnected paths to a preselected destination along one of the paths in accordance with an addressing code established by the relative spacing of coding elements on the carrier. Specifically, there are provided path defining means, responsive to a plurality of coincident electrical signals, for establishing a predetermined course of travel for the carrier through the transport network. Actuating means which includes a plurality of sensing elements relatively positioned along the transport network and responsive to the presence of a plurality of coding elements of predetermined relative spacing are provided for developing a plurality of electrical signals including a reference signal, the accuracy with which the electrical signals represent a desired destination address increasing in approximate proportion to the velocity of travel of the carrier body past the actuating means. Compensating means are effectively responsive to the velocity of travel of the carrier for establishing a maximum time interval commencing with the reference signal, during which coincidence of the signals may occur, this maximum time interval being varied by the compensating means in approximate inverse proportion to the velocity of travel of the carrier.

In accordance with other facets of the invention, the compensating means is also effective to inhibit operation of the path defining means if the compensating means receives a signal concurrently with both sensing elements of the actuating means, as is the usual situation under spurious noise conditions. Furthermore, the coding elements are mounted on the carrier in a predetermined manner to preclude development of distorted signals attendant movement of the carrier at relatively high velocities.

BRIEF DESCRIPTION OF THE DRAWINGS

The features of the present invention which are believed to be novel are set forth with particularity in the appended claims. The invention together with further objects and advantages thereof may best be understood, however, with reference to the following description taken in connection with the accompanying drawings in the several figures of which like reference numerals identify like elements and in which:

DESCRIPTION OF THE PREFERRED EMBODIMENTS

Figure 1:
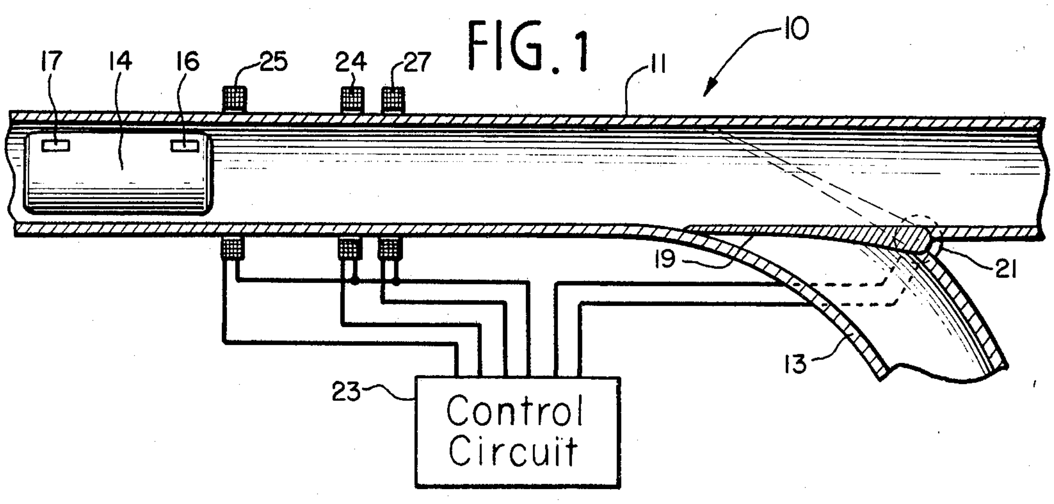
FIGURE 1 is a schematic illustration of a pneumatic tube system according to the present invention.

Referring now to FIGURE 1, there is illustrated a portion 10 of pneumatic tube system which includes a primary pneumatic guide tube 11 which is interconnected to a secondary guide tube 13 of similar dimensions. The guide tube 11 may be provided with any desired number of branch conduits along the course of its length and the secondary conduit 13 may likewise branch at selected locations to thereby provide a network of interconnected transport paths. Certain branch conduits are made dead-ends to provide exit passages to associated receiving stations. For instance, the branch conduit 13 may be such a dead-end conduit.

The interconnected guide tubes provide a transport network through which a carrier body 14 is directed to a preselected destination. The carrier 14 is of conventional cylindrical outline and has a hollow interior to which access may be had through a door located at one end of the carrier. The hollow interior chamber of the carrier 14 is adapted to reecive messages or other materials as is well understood in the art. The destination for the carrier 14 is precoded by the sender in accordance with an addressing code established by the relative spacing of coding elements, such as the magnets 16 and 17, which are mounted in axially spaced relation on the periphery of the carrier body. The forwardmost magnet in the direction of travel, namely magnet 16, is typically held in a fixed position while the magnet 17 may be adjustably positioned along a guide track (not shown) in which both of the magnets are situated.

The carrier 14 is impelled through the guide tubes of the transport network by air pressure and the course of travel which it follows at a juncture between two guide tubes is determined by a path defining means which includes a guide arm 19. The guide arm 19 is mounted internally of the conduits and is actuable from its normal solid line position, which permits unobstructed passage of the carrier 14 through the conduit 11, to an alternate or dotted line position which causes the carrier to be deflected into the branch conduit 13. The guide arm 19 is operable from a motor 21 or the like which is actuated by a solenoid (not shown). The actuating solenoid of the motor 21 is energized under appropriate conditions from the remaining apparatus of the path defining means which is included within a control circuit 23.

The control circuit 23 is effective to operate the guide arm 19 in response to electrical signals of a predetermined timed relationship which are developed in a pair of spaced sensing elements, such as the annular induction coils 24 and 25. Specifically, each of the coils 24 and 25 has an electrical signal induced therein upon passage of each of the magnets 16 and 17 of the carrier 14. The control circuit 23, however, is only effective to operate the guide arm 19 when the electrical signals induced in the coils 24 and 25 are such as to provide time coincident control signals in control circuit 23. This condition only occurs if the spacing of magnets 16 and 17 bears a predetermined correspondence to that of coils 24 and 25 and the carrier 14 is momentairly aligned with the coils. Thus, assuming that the spacing of magnets 16 and 17 is of the required correspondence to that of sensing coils 24 and 25, the gate member 19 is actuated upon the carrier passing the coils and the carrier 14 is deflected into the branch conduit 13. On the other hand, if the spacing of the magnets sufficiently differs from that of coils 24 and 25, the arm 19 is not actuated and the carrier 14 continues unimpeded along conduit 11.

Pneumatic tube systems to the extent above described are well-known to the art and further details thereof as well as variations from the arrangement described are disclosed in Patent 3,332,639 assigned to the same assignee as the present invention. The arrangement of the present invention, however, includes a further sensing coil 27 positioned a predetermined short distance beyond the coil 24 in the direction of movement of the carrier 14. The coil 27 is connected to the control circuit 23 and is a part of a compensating means which forms the subject of the present invention.

Before proceeding to a description of the operation and purpose of the compensating means, it is first helpful to have a clear understanding of the operation of the prior art system. Specifically, the passage of magnets 16 and 17 by each of the coils 24 and 25 induces respective electrical signals therein which are typically of a relatively long duration and a slight amplitude. Such signals are not effective to reliably operate the path defining mechanism and, accordingly, these signals are converted to approximately square wave pulses of sufficient amplitude within the control circuit 23. More particularly, the signals induced in coil 25 are typically converted to short duration "read" pulses within the control circuit 23 while the signals induced in the coil 24 are converted to square wave "reference" signals of a substantially longer duration. The reference signal duration is sufficient to accommodate the tolerance errors in relative spacing of the sensing coils and the code elements while not being of so long a duration as to provide coincident signals for code element spacings other than that to be detected by sensing coils 24 and 25.

Figure 2:
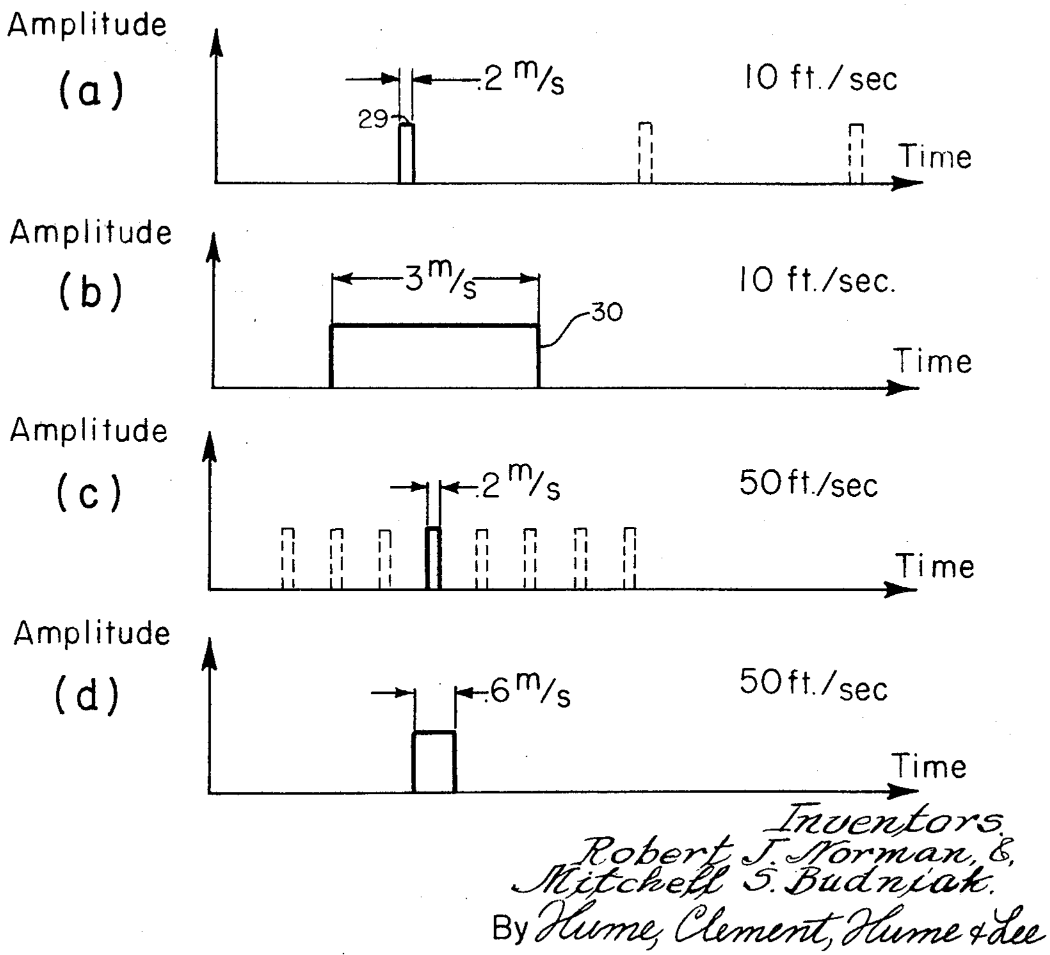
FIGURES 2(*a*)–(*d*) are graphical illustrations useful in understanding the operation of the circuit of FIGURE 1.

By way of example, a "read" signal 29 of FIGURE 2(*a*) is developed in the control circuit 23 upon alignment of the magnet 17 with the sensing coil 25. For convenience and clarity, the various signal waveforms of FIGURES 2(*a*)–(*d*) have been represented in a positive polarity sense although it will subsequently be recognized that in fact these signals are of an opposite or negative polarity in the preferred embodiment of the control circuit of FIGURE 3, simply because of the gender of the transistors there employed. The "read" signal is of a .2 millisecond duration and the similar duration signals which would be developed by the presence ot magnet 17 in each of a series of positions to which it is movable are shown in dotted outline in the drawing for an assumed carrier velocity of ten feet per second. In FIGURE 2(*b*), there is depicted the reference signal 30 which is developed by passage of the magnet 16 through the annular sensing coil 24. It is apparent that the leading edge of this reference signal precedes the read signal in time and the spacing of the sensing coils is selected to be somewhat shorter than that of a properly addressed carrier so that this result inevitably occurs. In the present instance, the spacing between coils 24 and 25 is approximately one-eighth inch less than the spacing between the magnets 16 and 17. Thus, the magnet 16 develops a signal in the coil 24 that nominally precedes the read pulse signal induced in the coil 25 by approximately one millisecond at a carrier velocity of 10 ft./sec.; precise centering of the read pulse within a reference pulse window nominally occurs at a carrier velocity of 50 ft./sec. with the aforesaid spacing as will presently become apparent in conjunction with a consideration of FIGURES 2(*c*) and 2(*d*). In this regard, the expression "alignment" as used herein and in the appended claims is intended broadly to denote that relative positioning of a properly addressed carrier and associated sensing elements which results in production of a carrier routing signal without reference to whether the physical spacing of the sensing elements is equal to that of the magnets.

The time scales for FIGURES 2(*a*) and 2(*b*) are identical and it is thus appreciated that alignment of the spaced code magnets 16 and 17 with the sensing coils 24 and 25 generates a pair of signals 29 and 30 which are time coincident. The signals 29 and 30 have been drawn under the assumption of ideal dimensional relationships, etc., but in fact the signals may be displaced relatively in time by as much as ±1 millisecond from their illustrated nominal positions at a carrier velocity of 10 ft./sec. Thus, it is preferable that the reference signal 30 at least approach its illustrated three millisecond duration to assure a full time coincidence between the signals.

At the assumed carrier velocity of ten feet per second, incremental changes of 0.406 inch in the relative spacing of magnets 16 and 17 define different code addresses. This spacing increment provides a satisfactory number of distinct addresses on a carrier of average length. However, if the rate of travel of the carrier 14 is increased to 50 feet per second, the relative spacing in the time domain of adjacent "read" positions, as viewed by the read coil 25, is as represented in FIGURE 2(*c*). From this figure, which is also of a like time scale to FIGURES 2(*a*) and 2(*b*), it is observed that the magnet 17 may be positioned in any one of five positions and still be coincident with the single reference pulse 30. Thus, it is necessary that the distance between the incremental positions for the code magnet 17 be increased by a factor of five in order for the control circuit to distinguish between adjacent code addresses. In other words, the code magnet 17 must now be movable in increments of no less than two inches which obviously reduces the number of code addresses for a carrier of reasonable length to a value which is prohibitively small for practical installation.

In accordance with the present invention, it has been found that the required duration for the reference signal to accommodate dimensional errors or the like within a given tolerance range varies approximately inversely with the velocity of the carrier. In other words, if the velocity of the carrier 14 is increased by a factor of five from ten feet per second to fifty feet per second, then the duration of the reference pulse 30 may be decreased in duration by a factor of five from three milliseconds to six-tenths millisecond without any attendant reduction in the reliability or accuracy of operation of the system. The tolerance range in the spacing of the sensing coils and the magnets translates to a tolerance range in the time domain approximately according to the formula:

$$\Delta T_e = \Delta D_e / V_c$$

where $\Delta D_e$=the dimensional tolerance range, $\Delta T_e$=the tolerance range in the time domain and $V_c$=carrier velocity. From this formula, it may be understood that a given dimensional tolerance range provides to a progressively smaller tolerance range in the time domain in inverse proportion to the velocity of the carrier 14. Since the time domain spacing of adjacent "read" code element positions is also inversely related to carrier velocity as is illustrated in FIGURES 2(*a*) and (*c*), respectively, a reduction in width of the reference pulse 30 in inverse proportion to the increasing velocity of the carrier permits precisely the same number of code element positions to be distinguished at relatively high velocities as are distinguished at low velocities. In other words, the six-tenths millisecond pulse 33 of FIGURE 2(*d*) is of an adequate duration to provide the same reliable operation at a carrier velocity of fifty feet per second as is provided by the three millisecond pulse required for accurate operation of the path defining mechanism at a carrier velocity of ten feet per second.

Figure 3:
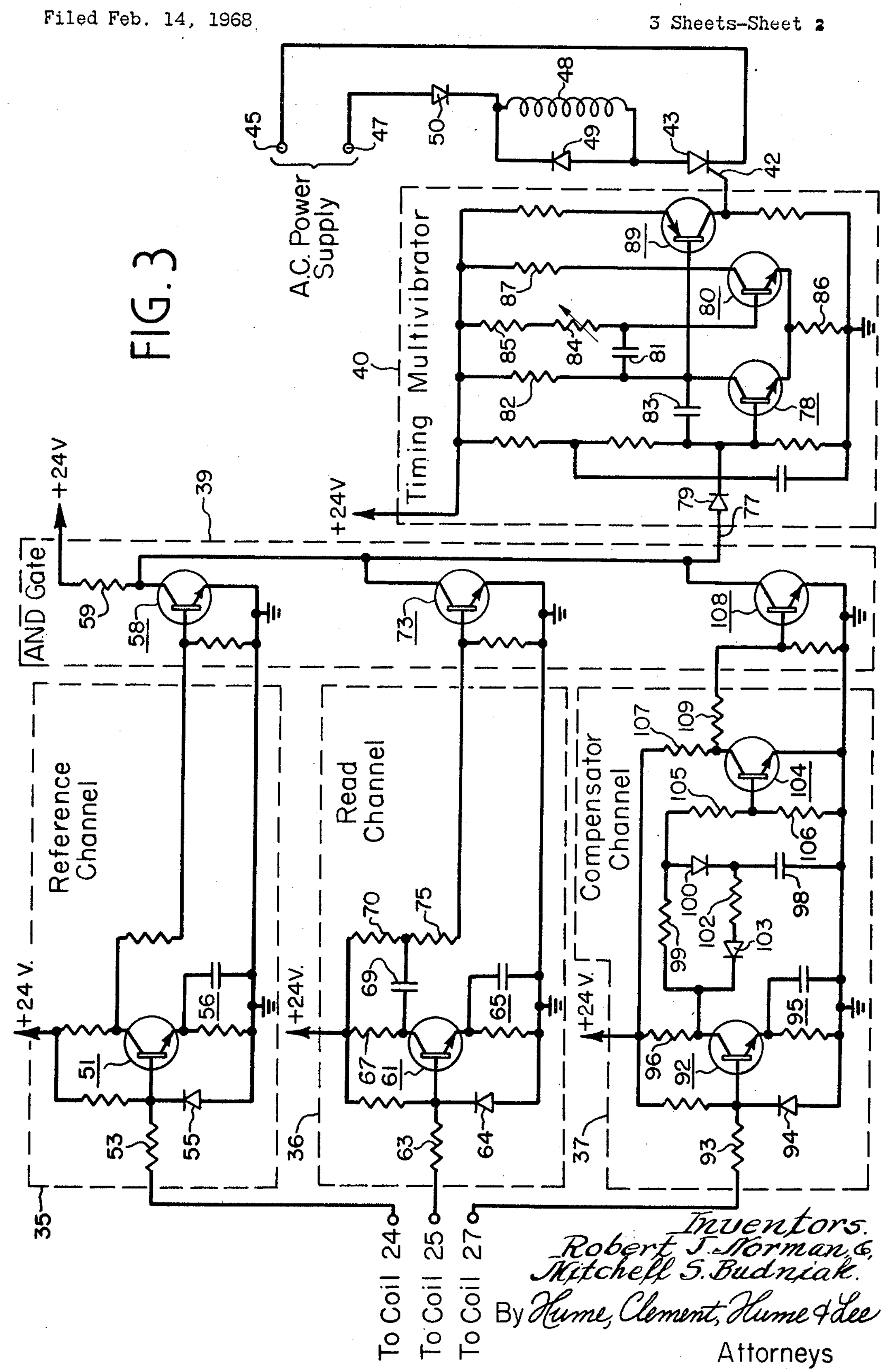
FIGURE 3 is a schematic diagram of a preferred form of control circuit for the system of FIGURE 1.

The sensing coil 27 and its associated compensating means within control circuit 23 is effective to alter the duration of the reference signal induced in the coil 24 in inverse proportions to carrier velocity, as now may be best understood by reference to the schematic of the control circuit 23 illustrated in FIGURE 3. The control circuit 23 includes three input channels, namely, a "reference" channel 35, a "read" channel 36 and a "compensator" channel 37 which channels are individually coupled to sensing coils 24, 25 and 27, respectively. The output waveform of each coil is an approximate single cycle sinusoid in which the negative polarity half-cycle precedes the positive polarity half-cycle. This is the typical waveform developed in a cylindrical sensing coil upon passage of a code magnet which is axially polarized in the direction of travel of the carrier on which it is mounted. Of course, the particular waveform or, for that matter, the type of coding and sensing elements employed are not factors critical to the present invention. Any suitable apparatus and signal waveforms known to the art may be used such as, for example, taught in the aforementioned patent 3,332,639.

Each of the channels 35, 36 and 37 provides a square wave output pulse of a predetermined duration in response to signals applied at their respective input terminals. The channels are coupled by individual conductor leads to respective inputs of an AND gate 39. The AND gate 39 is operative to provide an output signal to a timing multivibrator 40 of the monostable type only when the three gate transistors 58, 73 and 108 are concurrently in the non-conductive state.

The timing multivibrator 40 is coupled to a gate electrode 42 of a silicon controlled rectifier 43. The cathode of the controlled rectifier is coupled to one terminal 45 of a conventional sixty cycle alternating current supply source while the anode of controlled rectifier 43 is coupled to a remaining terminal 47 of the supply source by the parallel combination of a solenoid actuating coil 48 and a diode 49 and a series diode 50 which is poled oppositely to that of diode 49. The solenoid coil 48 and its associated solenoid (not shown) are effective to operate the motor 21 (FIGURE 1) and thereby actuate the gate 19 upon conduction of silicon controlled rectifier 43, as will be presently explained.

The reference channel 35 comprises an NPN transistor amplifier 51 which has its base electrode coupled through a current limiting resistor 53 to coil 24. The base electrode of transistor 51 is also coupled to ground through a diode 55 which by-passes the negative half-cycle of the input waveform. The emitter electrode of transistor 51 is coupled to ground through a parallel resistor-capacitor combination 56 while the collector electrode of this transistor is coupled through a conventional load resistor to a +24 volt power supply. The collector electrode of transistor 51 is also connected as an input to a first transistor switch 58 of the AND gate 39. Transistor 58 is of the NPN type and is coupled in conventional grounded emitter configuration with its collector electrode coupled to the +24 volt supply through a common load resistor 59 of the gate 39. Transistor 58 is normally in an on or saturated condition in which an approximately ground potential is applied to its collector electrode. A positive going input signal at the base of transistor 51 of the reference channel is effective to switch transistor 58 to an off or non-conductive condition.

The read channel 36 is generally similar to the reference channel 35 excepting only that the former includes a timing network for providing a specific short duration pulse in response to the presence of an induced signal in its associated coil 25. Specifically, the read channel 36 comprises an NPN transistor 61 having its base electrode coupled to coil 25 through a current limiting resistor 63 and to ground through a diode 64 poled to by pass negative polarity signals. The emitter electrode of transistor 61 is connected to ground through a conventional resistor-capacitor biasing network 65 while its collector electrode is coupled to the +24 volt biasing supply by parallel paths which include a resistor 67 and the series combination of a capacitor 69 and a resistor 70. The common junction of capacitor 69 and resistor 70 is coupled to the base of a second transistor switch 73 of the AND gate by a resistor 75. The described collector circuit of transistor 61 constitutes a timing network which is effective to provide a square wave output signal of a predetermined short duration in response to a positive going input signal at the base electrode of transistor 61 which input signal is of an indefinitely long duration. The negative going output pulse of transistor 61 is effective to turn off the normally conductive transistor 73 for a corresponding time intevral. The AND gate transistor 58 and 73 are coupled through a common output lead 77 to the timing multivibrator 40. Specifically, the output lead 77 is coupled to the base electrode of a first NPN multivibrator transistor 78 through a diode 79 which is poled to conduct on positive going signals at the output terminal 77 of the AND gate 39. The collector of the multivibrator transistor 78 is coupled to the base of a second multivibrator transistor 80 of similar gender through a timing capacitor 81; the base of transistor 80 is connected to the bias supply by a potentiometer 84 and a resistor 85. The collector of transistor 78 is also coupled to a +24 volt bias supply through a load resistor 82 and to its base by a feedback capacitor 83. The emitter electrodes of transistors 78 and 80 are coupled to ground through a common emitter resistor 86. The collector of the transistor 80 is connected to the bias supply through a conventional load resistor 87.

The output of the monostable multivibrator 40 is taken from the collector of the transistor 78 which is connected to the base electrode of an isolation stage comprising a transistor amplifier 89 of the PNP type. The emitter and collector electrodes of transistor 89 are connected in conventional fashion by individual load resistors to respectively the bias supply and ground potential. The collector of the normally non-conductive transistor 89 is also connected to the gate electrode 42 of the silicon controlled rectifier 43. As is well understood in the art, the controlled rectifier 43 is not conductive unless a signal of proper polarity and magnitude is applied to its gate electrode 42 concurrently with the application of a positive potential between its anode and cathode electrodes.

In accordance with the present invention, the control circuit 23 further includes a compensator channel 37. Specifically, this channel includes a transistor amplifier 92 which has its base electrode coupled through a current limiting resistor 93 to the sensing coil 27. The base circuit of transistor 92 likewise includes a diode 94 poled to shunt negative polarity signals to ground. The emitter electrode of transistor 92 is coupled to ground through a conventional resistor-capacitor biasing network 95 and its collector electrode is connected to the bias supply through a load resistor 96. The normally nonconductive transistor 92 is coupled to a timing capacitor 98 through a coupling resistor 99. A diode 100 is connected in series with the capacitor and poled to permit charging of the capacitor 98 from the +24 volt supply through series resistors 96 and 99. On conduction of transistor 92, a discharge path is provided for the capacitor 98 through a resistor 102, a diode 103 and the collector-emitter junctions of transistor 92 to ground. The resistor 99 also couples the collector of transistor 92 to the base of a phase inverter transistor 104 through a series resistor 105. The resistor 105 and a second resistor 106 connected between the base of the transistor and ground comprises a voltage divider for normally biasing transistor 104 to conduct. The emitter of transistor 104 is connected to ground while its collector is connected to the positive bias supply through a load resistor 107 and to the base electrode of a third transistor switch 108 of AND gate 39 by a coupling resistor 109. The transistor 108 has its emitter electrode coupled to ground and its collector electrode coupled to the positive bias supply through the common load resistor 59 of the AND gate. The transistor 108 unlike the other transistors of the AND gate is normally in an off or non-conductive condition but it biased to an on or conductive state by the invertor transistor 104 switching from its normally conductive to its non-conductive state.

In explaining the operation of the control circuit of the invention, it is assumed that the carrier 14 is precoded to operate the guide arm 19 and thus the relative spacing between code magnets 16 and 17 substantially corresponds to the spacing between the sensing coils 24 and 25, as previously discussed herein. It is further assumed that the carrier 14 is traveling at a velocity of ten feet per second and has moved to a position within the guide tube 11 whereat the magnets 16 and 17 are aligned respectively with coils 24 and 25. Under the recited conditions, electrical signals of the aforesaid sinusoidal waveform are applied to the base electrodes of transistors 51 and 61 of the respective channels in an appropriately timed relationship.

Figure 4:
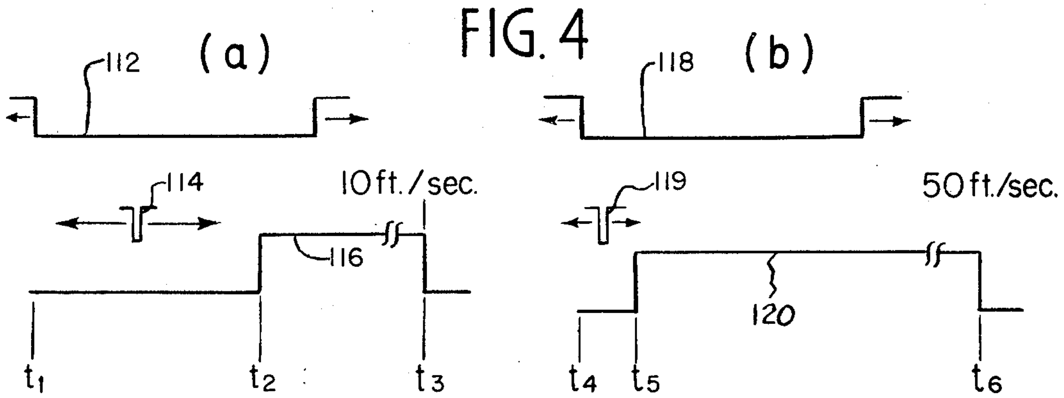
FIGURES 4(*a*) and 4(*b*) are graphical illustrations helpful in understanding the operation of the circuit of FIGURE 3.

The duration of the input signal from coil 24 is comparatively long and the amplified signal coupled to the base of AND gate transistor 58 is effective to turn off this transistor for a time interval which is at least equal to the tolerance time interval of the system at the assumed ten foot per second velocity. Specifically, and with reference to FIGURE 4(*a*), a negative going square waveform 112 is developed at the base electrode of AND gate transistor 58 for a time interval which is substantially in excess of the tolerance time interval $T_1$–$T_2$.

On the other hand, the read channel 36 includes the previously described timing network for providing a comparatively short duration negative going pulse at the base of AND gate transistor 73 in response to the magnet 17 passing the coil 25. This signal is represented as the pulse 114 in FIGURE 4(*a*) and, of course, occurs within the time interval $T_1$–$T_2$. The previously mentioned unavoidable dimensional errors in the system may result in the pulses 112 and 114 being shifted along the time axis relative to one another, as schematically depicted in the figure by the horizontal arrows on either side of these pulses. There is sufficient time overlapping between the pulses, however, that there is assured to be a coincidence therebetween sometime during the preselected tolerance time period $T_1$–$T_2$; the portion of pulse 112 extending beyond the time $T_2$ is ineffective to permit coincidence of this signal with a code magnet in a position adjacent to that of the code magnet 17 because of the operation of the compensator as will not be explained.

An electrical signal is not communicated to the compensator channel until the reference magnet 16 passes beyond the reference sensing coil 24 and comes into alignment with the coil 27. At this time, the positive going portion of the sine wave signal coupled from the sensing coil 27 to the base electrode of the amplifier transistor 92 turns this transistor on and thereby provides a discharge path for the capacitor 98 through the transistor to ground. When the magnet 16 passes the coil 27, the transistor 92 returns to its normally off condition, however, the discharged capacitor 98 must now be recharged from the positive bias supply through series resistors 96 and 99 and diode 100 before the potential is increased at the base electrode of invertor transistor 104 sufficiently to return this transistor to its normally on condition. The time interval during which transistor 104 remains in an off condition is long relative to the duration of the induced signal in coil 27 and is properly of sufficient duration to permit the carrier 14 to entirely pass beyond the several sensing coils. Typically this time interval may be one-tenth second. This positive going pulse at the collector of invertor transistor 104 is applied to the base of gate transistor 108, for the time $T_2$–$T_3$, as represented by the waveform 116 of FIGURE 4(*a*).

The sensing coil 27 of the compensator channel is positioned a precise distance beyond the sensing coil 24 such that the pulse 116 commences precisely at the time $T_2$ for a carrier velocity of ten feet per second. Thus, with the understanding that the AND gate 39 can only provide a positive signal at its output terminal 77 when all of the transistors therein are in an off condition, it will be recognized that only during some brief period within the interval $T_1$–$T_2$ is this condition satisfied. Since, as previously stated, the interval $T_1$–$T_2$ corresponds to the tolerance range of the system as represented in a time domain, it is certain that the developed output signal will uniquely indicate a predetermined code address. The AND gate is then retained in an off or disabled condition for a one-tenth second interval as represented by the time period $T_2$–$T_3$ of the pulse 116.

Referring again to FIGURE 3, the output pulse of AND gate 39 is communicated from its output terminal 77 to the electrode of the transistor 78 of the timing multivibrator 40. This signal keys the normally non-conductive transistor 78 on and the normally conductive transistor 80 off for an interval defined by the timing capacitor 81 in conjunction with its associated timing resistors. Thus, a negative going pulse of a predetermined duration is applied to the base of the isolation transistor 89 which in turn provides a positive going signal of like duration to the gate electrode 42 of the controlled rectifier 43. The presence of the signal at the gate of the controlled rectifier conditions this device for conduction on positive half-cycles from the AC supply source. Thus, a pulsating unidirectional current flows through solenoid coil 48 for a time interval corresponding approximately to the duration of the signal at gate electrode 42. This actuates the solenoid 21 to shift the guide arm 19 of FIGURE 1 to its dotted line position; the inertial time constant of the solenoid is such that it is insensitive to the non-uniformity of current flow and, accordingly, the gate remains in its dotted line position until the gating signal is removed from the control electrode 42 of the controlled rectifier. The period during which the controlled rectifier is conditioned for conduction by the timing multivibrator 40 is long enough to assure that the carrier 14 clears the junction of the guide tubes 11 and 13.

Continuing with an explanation of the operation of control circuit 23, it is now assumed that the velocity of travel of the carrier 14 is fifty feet per second instead of ten feet per second and that the carrier is again momentarily positioned with its code magnets 16 and 17 in alignment with the coils 24 and 25. In this case, the signal at the collector of the gate transistor 58 is again of a comparatively long duration, as represented by the negative pulse 118 in FIGURE 4(*b*). Further, the input signal to the read channel 36 is effective to provide a negative going pulse of the timed .2 millisecond duration at the base electrode of the gate transistor 73, as previously described and as represented by the pulse 119 of the drawing. The time interval from $T_4$ to $T_5$ represents the minimum duration time interval necessary to assure time coincidence between the pulses 118 and 119.

The compensator channel and its associated signal coil 27 function to reduce the effective duration of the reference pulse 118 to a time interval $T_4$–$T_5$ which is one-fifth the duration of time interval $T_1$–$T_2$. Specifically, the time required for reference magnet 16 of the carrier 14 to move from a position in alignment with the sensing coil 24 to a position in alignment with the sensing coil 27 is now only one-fifth as long as when the carrier was moving at a velocity of ten feet per second. Thus, a positive going pulse 120 is communicated to the base electrode of gate transistor 108 at precisely the time $T_5$. The positive pulse 120 persists for the one-tenth second timed interval provided by the resistor-capacitor timing network of the compensator channel, as represented by the interval $T_5$–$T_6$ in FIGURE 4(*b*).

In summary, the control circuit of the present invention is effective to provide a reference signal duration which is inversely proportional to the velocity of the carrier to thereby permit the same close spacing between adjacent code addresses at any velocity from a minimum to a maximum value.

The compensator channel may also serve to render the control circuit substantially immune to actuation from spurious noise signals. More particularly, the signal sensitivity of the compensator channel may be made somewhat higher than that of either of the reference or read channels 35 and 36. This may be conveniently accomplished since the compensator channel requires an additional transistor 104 for its normal operation. Under such circumstances, noise signals capable of rendering channels 35 and 36 operative are almost invariably communicated to the compensator channel in sufficient amplitude to render this circuit operative. Since operation of the compensator channel renders the gate 39 incapable of passing a pulse for a one-tenth second interval, a spurious pulse cannot be communicated from the gate 39 to the timing multivibrator 40 during this period and thus the guide arm 19 is not actuated. Of course, during this one-tenth second interval, the control circuit is also incapable of responding to signals induced in the coils 24 and 25 from a properly coded carrier. However, the probability that such a carrier will pass this station at a coincident point in time is highly remote and, accordingly, the noise immunity of the system would be improved with only a minimum risk that the control circuit would not be conditioned to respond to desired control signals.

Figure 5:
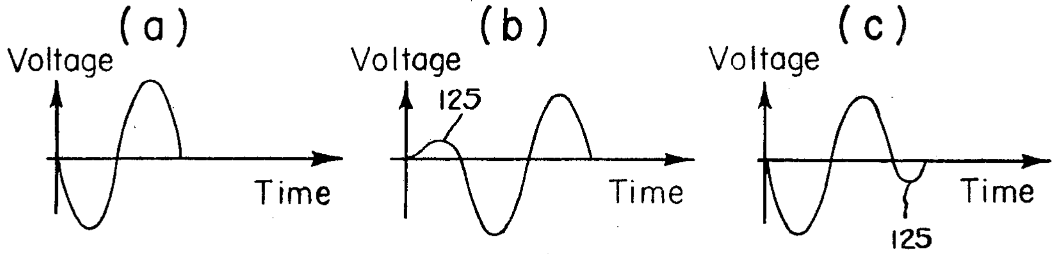
FIGURES 5(*a*)–5(*c*) are further graphical illustrations depicting respectively the desired waveform of signal induced by a carrier code element, a distorted waveform resulting at a relatively high carrier velocity and one form of corrected waveform attainable by using the teachings of the present invention.

It will be recalled that the code magnets 16 and 17 are axially polarized in the direction of travel of the carrier 14. The signal waveform induced in an encircling inductor coil, such as the coils 24, 25, and 27, is a single cycle sine wave as described previously herein. A representation of this ideal waveform is reproduced in FIGURE 5(*a*). As the velocity of the carrier 14 is increased to relatively high values, for example, fifty feet per second, the induced signal in the surrounding coil is distorted and a leading portion 125 becomes evident, as shown in FIGURE 5(*b*). This leading portion is of like polarity to the positive going signal portion used to trigger the reference and read channels and, accordingly, these circuits may falsely respond to the signal portion 125 as well as the primary positive going signal.

Figure 6:
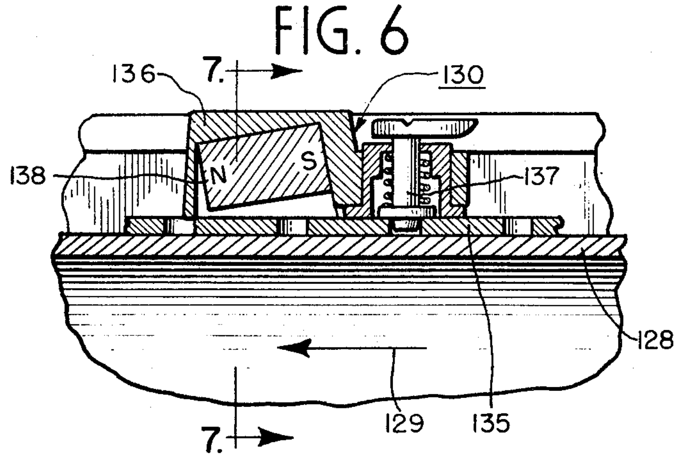
FIGURE 6 is an exploded, fragmentary view of the mounting of a code element on a carrier body according to the present invention.
Figure 7:
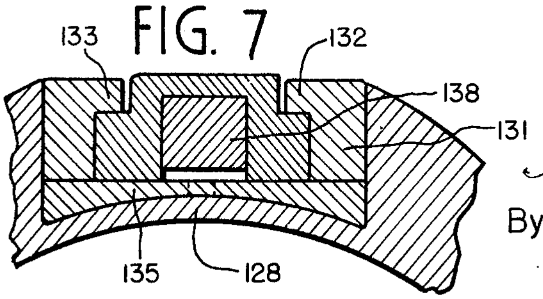
FIGURE 7 is a view taken along lines 7—7 of FIGURE 6.

It has been found that the distorted leading edge portion 125 of the induced signal may be eliminated by a special mounting of the code magnets on the carrier body. Specifically, with reference to FIGURES 6 and 7, there is illustrated a portion of a carrier 128 which is movable along a path parallel to an arrow 129. One axially adjustable magnet assembly 130 of the carrier 128 is illustrated as riding in a longitudinal guide track 131 of generally U-shaped configuration. Top portions 132 and 133 of each side wall of the guide track are turned inwardly to retain the magnet assembly within the confines of the guide track. A base portion 135 of the guide track is slotted at regularly spaced intervals to accept a spring biased locking post 137 of the magnet assembly. Each of the slots in the base 135 of the guide track represents a position in which the magnet assembly may be located and the relative spacing of the magnet assembly 130 with respect to a fixed reference magnet in each of these positions defines a different code address.

The magnet assembly 130 further includes a magnet holder 136 which retains a code magnet 138 in a position in which the longitudinally polarized axis of the magnet defines a positive acute angle with the axis of the carrier which is parallel to the arrow 129. It has been found that by rotating the magnet 138 in the manner illustrated, the distorted signal portion 125 in FIGURE 5(*b*) is eliminated thereby inducing an ideal signal waveform, as shown in FIGURE 5(*a*) in the sensing coils.

The foregoing arrangement provides excellent results for all magnets on the carrier except that the lead or reference magnet of each guide track must be rotated substantially more than any of the remaining code magnets to provide full distortion compensation. This is believed attributable to the fact that there is no opposite polarity magnet pole preceding the reference magnet to assist in effectively rotating its magnetic field in the desired counter-clockwise direction. Since it is often not convenient to increase the depth of the guide track 131 to accommodate the exceptional rotational angle required for the reference magnet, it is desirable to provide a more suitable solution to the problem. It has been found that reversing of the reference magnet such that its south pole rather than its north pole is facing forward provides a satisfactory solution to the problem. In this case, the waveform of FIGURE 5(*b*) is likewise reversed end for end so that the signal that would be induced in the associated sensing coil is the positive polarity and negative polarity primary portions of the signal wave, respectively, followed by the signal portion 125. This signal may be inverted in polarity merely by reversing the terminals of the sensing coil 24 and the waveform of such a signal is represented in FIGURE 5(*c*). As there shown, only one positive polarity signal portion is present and, therefore, no ambiguity exists in the signal as communicated to the reference channel. Since the reference magnet also induces a signal in the compensator channel, it is likewise necessary that the terminals of the sensing coil 27 be reversed with respect to the input of this channel. Thus, the reversal of the reference magnet provides an effective compensation for the signal distortion attributable to high carrier velocities without the necessity of increasing the depth of the guide track. Interaction between the oppositely wound sensing coils is substantially avoided by use of current limiting resistors 53, 63 and 93 for the channels 35, 36 and 37, respectively.

While a particular embodiment of the present invention has been shown and described, it is apparent that various changes and modifications may be made, and it is therefore intended in the following claims to cover all such modifications and changes as may fall within the true spirit and scope of this invention.

We claim:

1. In a pneumatic tube system or the like in which a carrier is selectively directed through a transport network to a preselected destination according to an addressing code defined by the predetermined relative spacing of code elements on said carrier, the combination comprising:

path defining means responsive to a plurality of coincident electrical signals for establishing a predetermined course of travel fo said carrier through said transport network;

actuating means including a plurality of sensing elements relatively positioned along said transport network and responsive to a plurality of code elements of a predetermined relative spacing for developing a plurality of electrical signals including a reference signal of a predetermined minimum duration related to a minimum velocity of travel of said carrier;

and compensating means, effectively responsive to said velocity of travel of said carrier, for regulating the effective duration of said reference signal in inverse proportion to said carrier velocity to provide accurate differentiation between closely adjacent code element positions at all carrier velocities between said minimum and a predetermined maximum.

2. The combination according to claim 1 in which said actuating means includes a pair of spaced sensing elements which are adapted to provide time coincident electrical signals in response to momentary and concurrent alignment of a pair of said code elements of a predetermined relative spacing related to that of said spaced sensing coils.

3. The combination according to claim 2 in which said path defining means includes an AND gate having inputs coupled from both said sensing elements and from said compensating means for operating said path defining means only in response to developed time coincident signals of a predetermined like polarity at the output of said AND gate.

4. The combination according to claim 3 in which said compensating means includes a third sensing element coupled to said AND gate for inhibiting said AND gate for a predetermined time in response to the momentary alignment of a code element with said third sensing element.

5. The combination according to claim 4 in which said third sensing element is positioned along said transport network a predetermined short distance beyond said first and second sensing elements for developing an electrical signal which is delayed in time with respect to said reference signal in proportion to said velocity of travel of said carrier.

6. The combination according to claim 5 in which said one of said sensing elements of said actuating means is effective to develop a signal of a duration not substantially exceeding a minimum pulse duration required to actuate said path defining means.

7. The combination according to claim 6 in which said actuating means includes a guide arm adjacent a juncture in said transport network between two paths, and guide member normally occupying a position to route said carrier into one of said paths but actuable to a second position to direct said carrier along the other of said paths and further in which said path defining means includes a time delay device for maintaining said guide arm said other position for a predetermined time interval to assure passage of said carrier past said junction.

8. The combination according to claim 3 in which said compensating means is provided with a signal sensitivity at least equal to that of said actuating means for substantially precluding operation of said AND gate in response to spurious electrical signals.

9. The combination according to claim 8 in which said sensing elements are inductor coils and in which said code elements are magnets.

10. The combination according to claim 7 and further including signal current limiting means associated with each of said sensing elements of said actuating means and said compensating means for substantially preventing signal current interaction between said sensing elements.

References Cited

UNITED STATES PATENTS

| | | | |
|---|---|---|---|
| 3,055,611 | 9/1962 | Stout | 243—16 |
| 3,222,577 | 12/1965 | Kennedy | 243—16 |

HARVEY C. HORNSBY, Primary Examiner

U.S. Cl. X.R.

243—38

UNITED STATES PATENT OFFICE
CERTIFICATE OF CORRECTION

Patent No. 3,507,460 Dated April 21, 1970

Inventor(s) Robert J. Norman et al.

It is certified that error appears in the above-identified patent and that said Letters Patent are hereby corrected as shown below:

In the heading to the printed specification, lines 4 to 5, "assignors to The Powers Regulator Company, Skokie, Ill., a corporation of Illinois" should read -- assignors, by mesne assignments, to Powers Regulator Company, Skokie, Ill., a corporation of Delaware --. Column 8, line 24, "it" should read -- is --; line 69, after "compensator" insert -- channel --; line 69, "not" should read -- now --. Column 9, line 16, after "time" insert -- interval --; line 36, before "electrode" insert -- base --. Column 11, line 65, "fo" should read -- for --. Column 12, line 41, "actuating" should read -- path defining --; line 42, "and" should read -- said --; line 43, "member" should read -- arm --.

Signed and sealed this 3rd day of November 1970.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
★ U.S. GOVERNMENT PRINTING OFFICE : 1969 O—366-334